United States Patent [19]

Palloch

[11] 4,144,755
[45] Mar. 20, 1979

[54] V-BELT PULLEY

[75] Inventor: Herbert Palloch, Schwetzingen, Fed. Rep. of Germany

[73] Assignee: Teledyne Mid-America Corporation, Los Angeles, Calif.

[21] Appl. No.: 874,900

[22] Filed: Feb. 3, 1978

[51] Int. Cl.² .................. F16H 55/36; B25G 3/00; F16B 11/00

[52] U.S. Cl. .................. 74/230.01; 403/16

[58] Field of Search .......... 403/16, 361; 74/230.01, 74/230.4

[56] References Cited

U.S. PATENT DOCUMENTS 2,569,144  9/1951  Benson .................. 74/230.01 X
3,033,597  5/1962  Miller .................... 403/16 X Primary Examiner—Leonard H. Gerin
Attorney, Agent, or Firm—Edelson and Udell

[57] ABSTRACT

This invention relates to pulleys or similar parts with a hub, the hub being provided with a tapered bore for assembly to a shaft having a complementally tapered end. The hub is provided with a draw-off arrangement which consists of a flanged nut screwed onto a threaded projection on the end of the shaft and which presses against a shoulder within the hub when attaching the part. When detaching the part the nut flange bears against a radially overhanging axially mounted back-stop ring either formed integrally with the hub or by a washer secured to the hub.

12 Claims, 3 Drawing Figures

V-BELT PULLEY

This invention relates generally to a V-belt pulley or similar part with a hub, the hub being provided with a tapered bore for assembly to a shaft having a complementally tapered end. The hub is provided with a draw-off arrangement which consists of a flanged nut which is screwed onto a threaded projection on the end of the shaft and which presses against a shoulder within the hub when attaching the part, or when detaching the part bears against an overhanging axially mounted backstop ring.

Tapered connections between shafts and pulleys are well known and are widely used. Adhesion between the pulley and shaft is generally so great that disassembly of the elements is frequently performed by striking the end of the shaft and thereby loosening the pulley. This can cause damage to the shaft bearings. Alternatively lever pressure may be applied to the pulley. This pressure usually is at an angle with the center line of the shaft and causes a deleterious bending of the shaft, thereby causing out-of-round operation.

Historically, for these reasons, draw-off devices such as aforedescribed have been used. On these devices, the backstop ring generally consists of a retaining ring fitted into a groove adjacent to the hub face. In this design the initial machining operation produces a conical bore and the machined belt groove. A second operation follows in which the part is reversed, rechucked and the retaining ring groove machined. In view of the cost of an otherwise unmachined pulley, and since the part is a simple, quantity production article, the labor cost for this operation is relatively high. Also, the cost of retaining rings is relatively high.

It is therefore an object of this invention to design a pulley with the above mentioned characteristics but of a design which permits easier and less costly manufacturing. This object is provided by the invention in which the flange of a draw-off nut supports itself against one or more projections which are formed at the hub face. A pulley of this design requires a single chucking on a turning type machine on which both the taper bore and belt groove are machined. The second operation for machining the ring groove is eliminated.

After insertion of the nut, one or more projections are produced by plastic deformation of the edge of the hub face. If a single projection is used it can, according to the advantageous design of the invention, be produced in the form of a ring which is concentric with the taper bore, if multiple projections are to be provided, they may be produced in a suitable equi-spaced arrangement.

A further advantageous design of the invention provides for a washer seated between an integrally cast shoulder within the hub and the formed projection at the hub face, and which provides a back-up surface for the nut. After inserting the nut in the hub recess, followed by the washer, the projection or projections are formed. This brings about another advantage in that the back-up washer is firmly retained without axial movement.

In this design it is generally advantageous to use multiple projections. The washer, partially at least, radially overlaps the shoulder, and the projections also radially overlap the washer. If, however, in accord with another design, the flange of the draw-off nut bears directly against the single projection, then that projection must radially cover at least a portion of that flange. For that purpose, the projection is best produced in a ring form.

To avoid stressing of the pulley when securing the V-belt pulley to the shaft, and for the purpose of providing for casting irregularities as well as preventing the draw-off nut from floating in the hub, the nut flange bears against a spring washer. The inventive application of this draw-off device on the V-belt pulley can also be applied to other pulleys, and also where parts other than pulleys are to be assembled to a tapered shaft and requiring detachment provisions. With a correspondingly elongated threaded tenon this device can also be used where cylindrical parts, provided with press fits, are to be disassembled.

The foregoing and other advantages and features of the invention will be better understood from a reading of the following specification in conjunction with an examination of the appended drawings, wherein.

Figure 1:
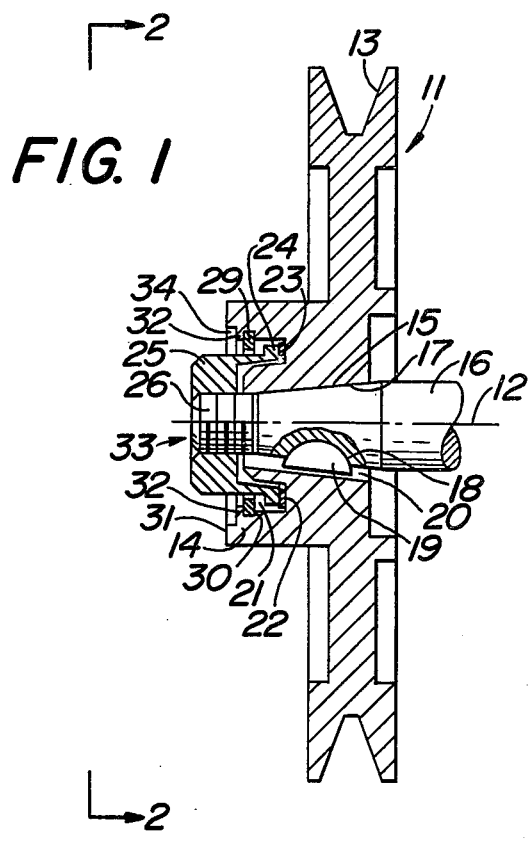
FIG. 1 is a cross section of a V-belt pulley showing one form of the invention.
Figure 2:
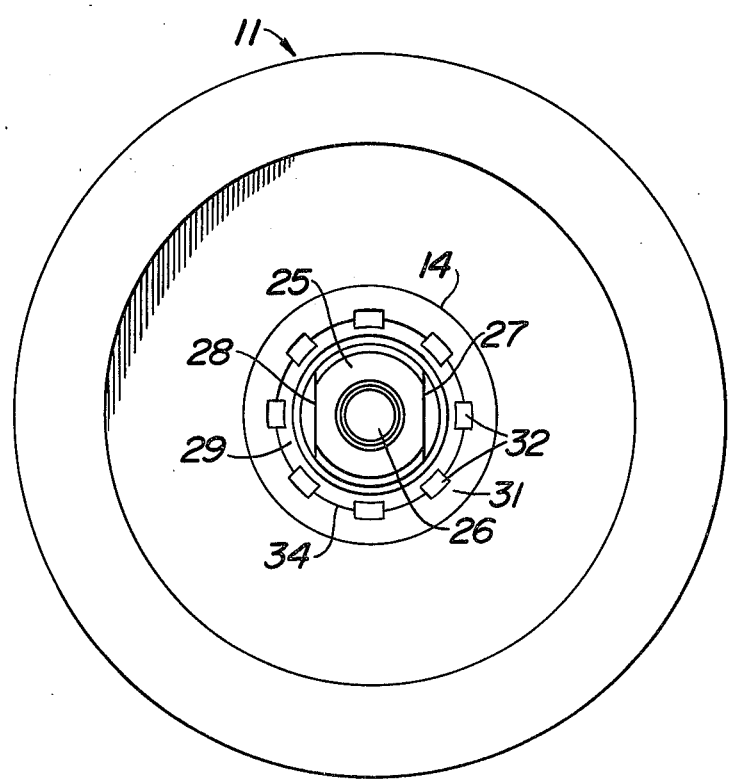
FIG. 2 is a frontal view of the V-belt pulley as would be seen when viewed along lines 2—2 of FIG. 1.

In FIGS. 1 and 2, the V-belt pulley 11 is provided with a V-belt groove 13 on its periphery, which groove is concentric with the pulley axis 12. A hub 14 of the V-belt pulley 11 is provided with a tapered bore 15 concentric with the axis 12, to the larger end of which (right side in FIG. 1) is affixed a shaft 16, to the opposite free end of which shaft is to be secured the pulley 11. For that purpose, the free end of the shaft is also provided with a taper 17 the angle of which is identical to the taper in the bore 15. When the taper bore 15 of the pulley 11 is pushed onto the tapered end 17 of shaft 16 a shake-proof connection is established between the elements 11 and 16. Rotational security between parts 11 and 16 is assured by a key 19 fitted into a recess 18 of shaft 16 and which is mated to a corresponding groove 20 in hub 14.

The end of the hub opposite the shaft 16 side is provided with an annular recess 21 which partially overlaps the taper bore 15. The bottom 22 of this recess 21 together with the spring washer 23 supports the flange 24 of a flanged hat-shaped threaded nut 25 which can be screwed onto a threaded tenon 26 which projects beyond the minor diameter of the tapered part 17 of shaft 16 and is axially concentric with the axis 12 of shaft 16. The axially symmetric nut 25 is provided with two flats 27 and 28 for wrench application purposes. Threading of the nut 25 onto the threaded tenon 26 after prior loose application of the pulley onto the taper 17 of the shaft provides a secure axial and radial connection between the tapered surfaces 15 and 17.

The nut 25 is secured against withdrawal from the recess 21 at a thrust bearing consisting of a ring shaped washer 29 which is located adjacent to the side of the nut flange 24 opposite the side which bears against the bottom of the recess 22 and spring washer 23 and which is placed so that it radially partially overlaps the flange 24 of nut 25. The inner diameter of this thrust bearing washer 29 is somewhat smaller than the outside diameter of the nut 25, within a predetermined range. Additionally the outside diameter of flange 24 is somewhat smaller than the diameter of recess 21, within a predetermined range. These two structural features and the fact that the spring washer 23 permits a minimum axial motion of flange 24, allows the nut 25 to assume a natural adjustment position when securing the pulley 11, thereby avoiding eccentric clamping of the pulley 11 to shaft 16.

The side of the washer facing the flange 24 of nut 25 and serving as a thrust bearing 29 is supported within the recess 21 of hub 14 by an integral shoulder 30. At its exterior surface, adjacent to the hub face 31 of the hub 14 it is overlapped by several protrusions 32 which are integrally formed parts of the hub 14. The flanged nut 25 together with the ring-shaped washer which comprises the thrust bearing 29, and which is secured to hub 14, serve as the draw-off device 33 for removing the V-belt pulley 11 from its seat on the shaft 16. Unscrewing of the nut 25 from the threaded tenon 26 of the shaft 16 causes the adjacent surfaces of the nut flange 24 and the thrust bearing washer 29 to impinge. Further unscrewing of the nut 25 from the threaded tenon 26 then results in pulling the V-belt pulley from taper 17 of shaft 16.

The pulley 11 is produced by a casting process. Only the belt groove 13 and the tapered bore 17 need be machined. This can be done in a single chucking on a turning type machine by holding the pulley casting by the protruding hub 14.

At assembly of the finished pulley structure, spring washer 23 is placed into the recess 21 followed by the nut 25 and the thrust bearing washer 29, which latter is seated against the shoulder 30. To secure these parts, the edges 34 of the hub are subjected to a swaging procedure which produces the nose shaped overhanging protrusions 32. This swaging procedure is practical for all materials which could be used for these V-belt pulleys, and especially when for reason of weight, light metals, steel or soft gray iron are used. Should the V-belt pulley 11 be made of a thermoplastic material, then the protrusions 32 can be produced by a corresponding deformation with the application of heat and pressure.

Figure 3:
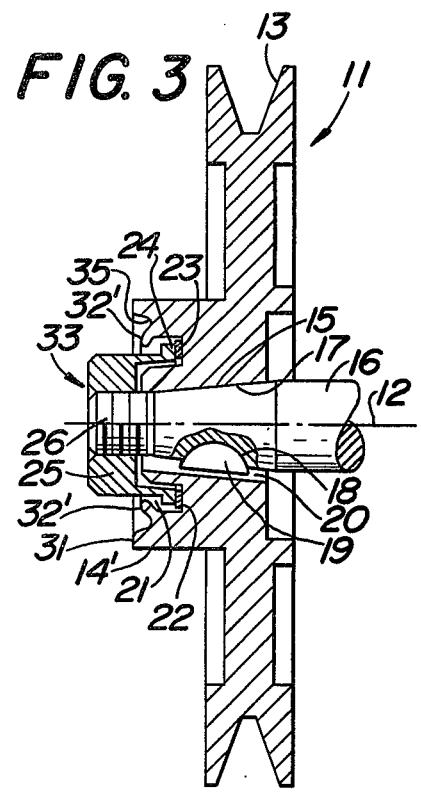
FIG. 3 is a cross sectional view of a V-belt pulley showing a second form of the invention.

The V-belt pulley shown in FIG. 3 is of the same basic design as that shown in FIG. 1, and the corresponding parts are therefore similarly numbered. In this design, however, the thrust bearing washer 29 is not used because the flange 24 bears directly against a ring-shaped integral overhang 32'. This ring-shaped overhang 32' is produced by swaging a ring-shaped groove 35 in the face 31 of the shortened hub 14', whereby the hub material is displaced into the end of recess 21. The inside diameter of this displaced ringlike protrusion 31', however, is to always be smaller than the minimum outer diameter of the flange 24 of nut 25 so that this flange can always brace itself against the overhang 32'.

Having now described my invention in connection with particularly illustrated embodiments thereof, it will be understood that variations and modifications of my invention may now occur from time to time to those persons normally skilled in the art without departing from the essential scope or spirit of the invention, and accordingly it is intended to claim the same broadly as well as specifically as indicated by the appended claims.

What is claimed to be new and useful is:

1. A mechanical draw-off device for a part having a hub with a tapered bore into which is fitted a shaft having a threaded free end and a tapered section proximate to the said free end, which shaft tapered section is tapered complementally to the tapered bore of the said hub, said draw-off device comprising in combination,
   (a) an annular recess formed in the hub and extending inward from the hub face proximate to the hub tapered bore end of smaller diameter, said recess being concentric with said tapered bore,
   (b) a nut having a main body threaded to rotatably engage the threaded free end of the said shaft when the latter is projected into the tapered bore of the hub, said nut having a flange extending peripherally radially from the main body and projecting freely rotatably into said hub annular recess, and
   (c) nut retention means carried by said hub effective to capture said nut flange within said hub recess while permitting axial movement of said nut with respect to said hub along the axis of said hub tapered bore, whereby, when said part is installed on said shaft, said nut is threadable onto said shaft threaded end and must be rotated in a first direction to advance said nut on said shaft for a distance before said shaft and hub become firmly engaged, and said nut when thereafter rotated in a direction counter to said first direction moves backward off of said shaft and engages said hub carried nut retention means to thereby draw said part off of said shaft.

2. A draw-off device as set forth in claim 1 wherein said nut retention means comprises at least one portion of said hub end which has been deformed radially inwardly to lie at a distance from the axis of the hub bore which is less than the radial extent of said nut flange.

3. A draw-off device as set forth in claim 1 wherein said nut retention means comprises at least one portion of said hub end which has been deformed radially inwardly to lie at a distance from the axis of the hub bore which is less than the radial extent of said nut flange, said radially inwardly deformed hub end extending as a continuous circular ring formation concentric with said hub bore.

4. A draw-off device as set forth in claim 1 wherein said nut retention means comprises an annular washer disposed against a shoulder in said hub annular recess and secured against movement by securing means carried by said hub, the inside diameter of said washer being less than the radial extent of said nut flange.

5. A draw-off device as set forth in claim 1 wherein said nut has a bore therethrough which is internally threaded to match external threading on the free end of said shaft.

6. A draw-off device as set forth in claim 1 further including an annular spring washer disposed in said hub annular recess and seatable against the recess end wall when said nut is threaded onto said shaft to cause said nut flange to bear against said spring washer and thereby secure said nut against vibratory movement when said shaft and hub are rotated.

7. A draw-off device as set forth in claim 2 wherein said nut has a bore therethrough which is internally threaded to match external threading on the free end of said shaft.

8. A draw-off device as set forth in claim 2 further including an annular spring washer disposed in said hub annular recess and seatable against the recess end wall when said nut is threaded onto said shaft to cause said nut flange to bear against said spring washer and thereby secure said nut against vibratory movement when said shaft and hub are rotated.

9. A draw-off device as set forth in claim 3 further including and annular spring washer disposed in said hub annular recess and seatable against the recess end wall when said nut is threaded onto said shaft to cause said nut flange to bear against said spring washer and thereby secure said nut against vibratory movement when said shaft and hub are rotated.

10. A draw-off device as set forth in claim 4 wherein said nut has a bore therethrough which is internally threaded to match external threading on the free end of said shaft.

11. A draw-off device as set forth in claim 7 further including an annular spring washer disposed in said hub annular recess and seatable against the recess end wall when said nut is threaded onto said shaft to cause said nut flange to bear against said spring washer and thereby secure said nut against vibratory movement when said shaft and hub are rotated.

12. A draw-off device as set forth in claim 10 further including an annular spring washer disposed in said hub annular recess and seatable against the recess end wall when said nut is threaded onto said shaft to cause said nut flange to bear against said spring washer and thereby secure said nut against vibratory movement when said shaft and hub are rotated.

* * * * *